US008544332B2

(12) United States Patent
Chiu

(10) Patent No.: US 8,544,332 B2
(45) Date of Patent: Oct. 1, 2013

(54) VIBRATION TESTING DEVICE

(75) Inventor: Hsien-Huan Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 227 days.

(21) Appl. No.: 13/172,830

(22) Filed: Jun. 30, 2011

(65) Prior Publication Data

US 2012/0174679 A1 Jul. 12, 2012

(30) Foreign Application Priority Data

Jan. 7, 2011 (TW) ................................. 100100608

(51) Int. Cl.
*G01M 7/06* (2006.01)
*B06B 1/00* (2006.01)

(52) U.S. Cl.
USPC ............................................... 73/663; 73/662

(58) Field of Classification Search
USPC .................... 73/662, 663, 664, 666, 667, 668
See application file for complete search history.

(56) References Cited

U.S. PATENT DOCUMENTS

| | | | | |
|---|---|---|---|---|
| 3,830,099 | A * | 8/1974 | Ichikawa | 73/668 |
| 4,240,141 | A * | 12/1980 | Vasiliev et al. | 318/114 |
| 4,947,067 | A * | 8/1990 | Habermann et al. | 310/51 |
| 5,042,643 | A * | 8/1991 | Akama | 198/753 |
| 5,351,545 | A * | 10/1994 | Lucas | 73/663 |
| 5,386,728 | A * | 2/1995 | Norton et al. | 73/668 |
| 5,948,987 | A * | 9/1999 | Liu | 73/663 |
| 6,389,900 | B1 * | 5/2002 | Leist et al. | 73/662 |
| 7,487,680 | B2 * | 2/2009 | Hammond et al. | 73/663 |
| 2006/0248955 | A1 * | 11/2006 | Fukushima et al. | 73/664 |
| 2008/0092662 | A1 * | 4/2008 | Mizuguchi | 73/666 |

* cited by examiner

*Primary Examiner* — Helen Kwok
(74) *Attorney, Agent, or Firm* — Altis & Wispro Law Group, Inc.

(57) ABSTRACT

An exemplary vibration testing device includes two mounting bases, a vibration generator located between the mounting bases, two pivot shafts, a supporting platform, two supporting elements and a control system. Each supporting element is telescopically extendable and retractable. The control system includes a lift control unit for controlling telescopic movement of the supporting elements, a first rotary control unit for controlling a rotationally movement of the vibration generator about the pivot shafts, and a second rotary control unit for controlling rotatable movement of the supporting elements about the pivot shafts. The control system is configured for controlling the vibration testing device to move between a first testing status in which vertical vibration forces are generated by the vibration generator and applied to the supporting platform and a second testing status in which horizontal vibration forces are generated by the vibration generator and applied to the supporting platform.

20 Claims, 9 Drawing Sheets

VIBRATION TESTING DEVICE

BACKGROUND

1. Technical Field

The disclosure relates to vibration testing devices for testing vibration-resistance performance of an electronic device.

2. Description of the Related Art

Electronic devices such as mobile phones and notebooks, for example, undergo a variety of tests at the manufacturer to ensure quality. Frequently, an electronic device is mounted in a vibration testing device to determine whether a vibration-resistance performance of the electronic device meets standard requirements.

The testing device includes a base and a vibration generator located on the base. During a vibration test, the electronic device is directly attached to the vibration generator to incur strong vibration generated from the vibration generator. The vibration generator generally can only shake along an axial direction thereof to generate vibrational movements along opposite vertical directions. However, the test results for vertical vibrational movements are generally different from the test results when the electronic device undergoes vibrations movements along directions different from the vertical directions. Thus in a typical vibration test, the test results that are used to determine the vibration-resistance performance of the electronic device may be inaccurate or misleading.

What is desired, therefore, is a vibration testing device which can overcome the above-described shortcomings.

DETAILED DESCRIPTION

Figure 1:
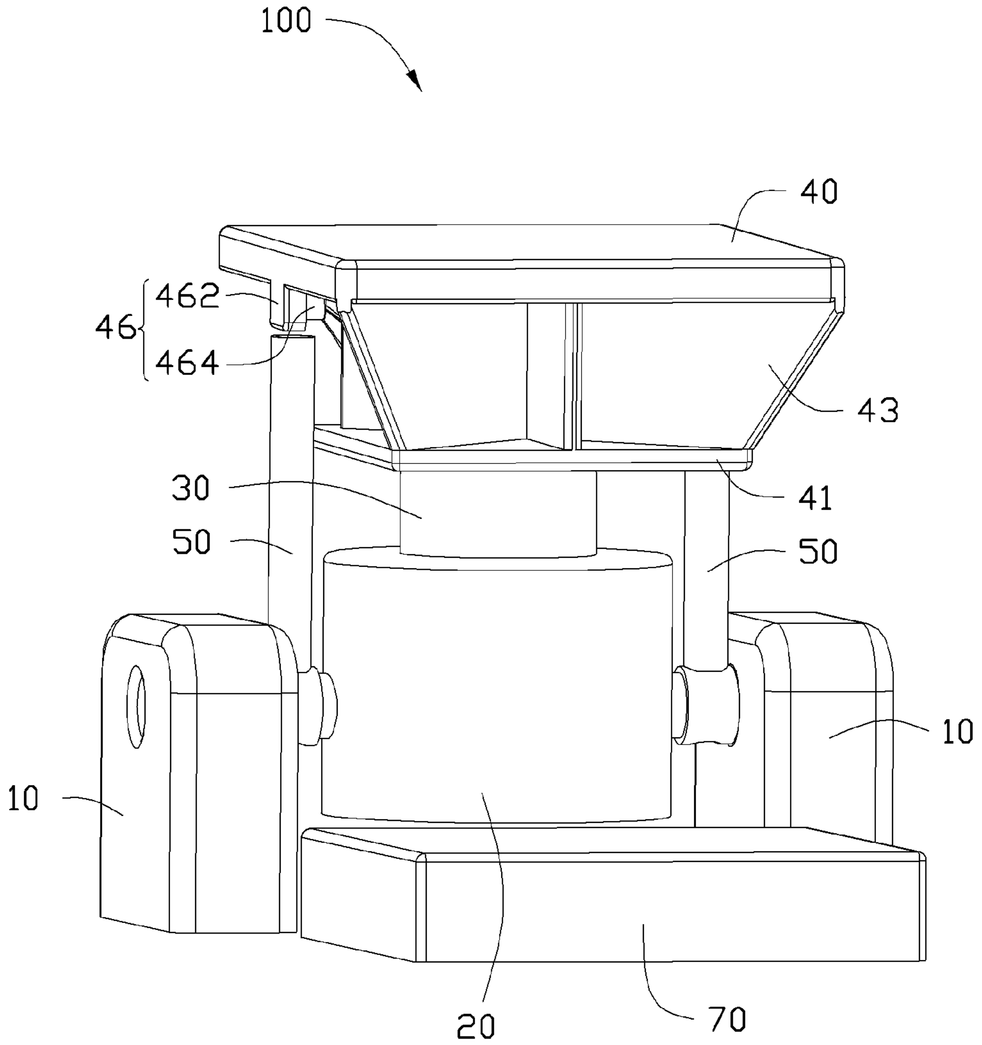
FIG. 1 is a schematic, isometric, assembled view of a vibration testing device in accordance with an exemplary embodiment, showing the vibration testing device in a first testing status in which vertical vibration forces can be generated.

Reference will now be made to the drawing figures to describe the present vibration testing device in detail.

Figure 2:
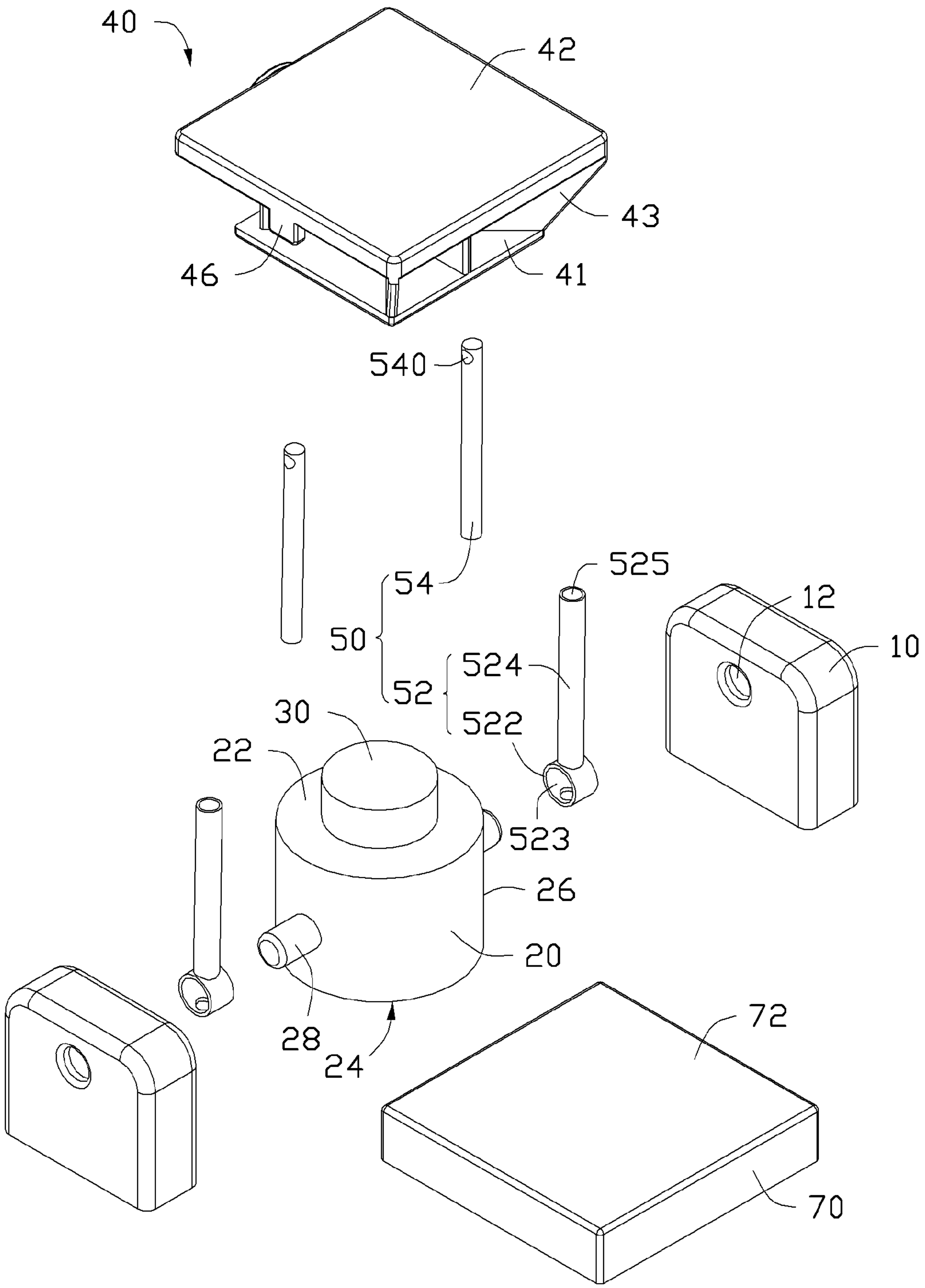
FIG. 2 is an exploded view of the vibration testing device of FIG. 1.
Figure 3:
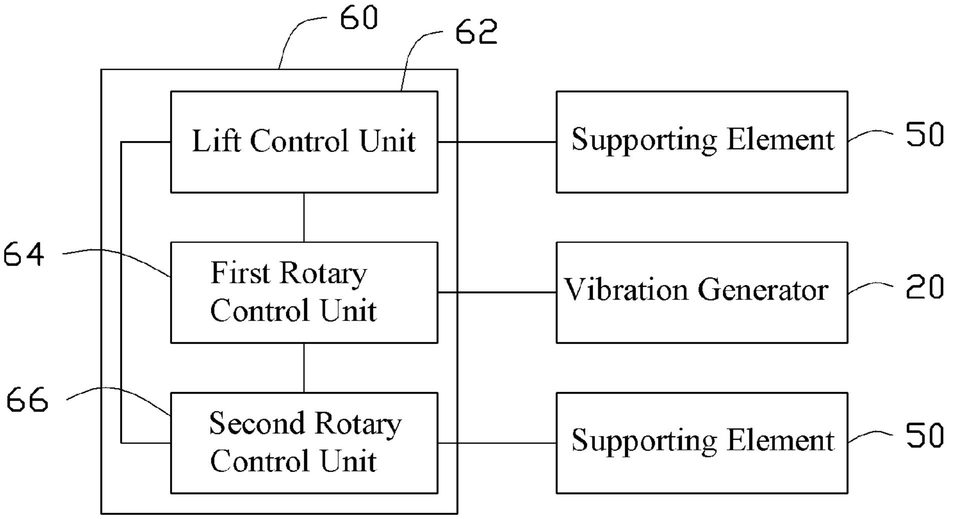
FIG. 3 is a block diagram of a control system of the vibration testing device of FIG. 1.

Referring to FIGS. 1-3, a vibration testing device 100 in accordance with an exemplary embodiment includes two mounting bases 10, a vibration generator 20 located between the two mounting bases 10, two pivot shafts 28, two supporting elements 50, an electromagnet 30, a supporting platform 40, a control system 60 and a lubricating table 70. The lubricating table 70 has lubricating oil spread on a top surface thereof.

The mounting bases 10 are parallel to and spaced from each other. Each of the mounting bases 10 is generally cuboid shaped, and defines a mounting hole 12 in a top end thereof. The mounting holes 12 face toward each other and are horizontally aligned with each other. Alternatively, the mounting bases 10 can be connected to each other via a connecting element, such as a bar, to thereby form an integral mounting base.

The vibration generator 20 is located midway between the mounting bases 10. The vibration generator 20 is substantially cylindrical, and includes a circular top surface 22, a circular bottom surface 24, and a cylindrical side surface 26 connected between the top surface 22 and the bottom surface 24. The vibration generator 20 can shake along an axial direction thereof. In FIGS. 1 and 2, a central axis of the vibration generator 20 is oriented along a vertical direction of the vibration testing device 100.

The pivot shafts 28 are arranged at two opposite sides of the side surface 26 of the vibration generator 20, respectively. Each of the pivot shafts 28 has one end rotatably connected to a corresponding side of the side surface 26 of the vibration generator 20, and the other end interferentially received in the mounting hole 12 of a corresponding mounting base 10. With such a configuration, the vibration generator 20 is rotatable with respect to the pivot shafts 28 under control of the control system 60.

The electromagnet 30 is substantially cylindrical, and has a horizontal cross section smaller than that of the vibration generator 20. The electromagnet 30 is mounted at the top surface 22 of the vibration generator 20, with a central axis of the electromagnet 30 coaxial with that of the vibration generator 20.

The supporting platform 40 includes a bottom plate 41, a top plate 42 parallel to and spaced from the bottom plate 41, a plurality of connecting plates 43 connected between the bottom plate 41 and the top plate 42, a side plate 44 (see FIG. 8) connected between corresponding rear sides of the bottom plate 41 and the top plate 42, and two fixing members 46 located at two opposite lateral sides of the top plate 42, respectively. Each of the bottom plate 41 and top plate 42 is substantially rectangular. The bottom plate 41 has a length and a width both larger than a diameter of the electromagnet 30. The top plate 42 is wider than the bottom plate 41, with a left side protruded out farther than a left side of the bottom plate 41, and a right side protruded out farther than a right side of the bottom plate 41, respectively.

Each of the connecting plates 43 extends from a center of the bottom plate 41 to a respective peripheral side or corner of the bottom plate 41. The connecting plates 43 and the side plate 44 can both increase a loading capacity of the supporting platform 40. A circular contacting member 48 (see FIG. 8) extends rearward and perpendicularly from a central portion of the side plate 44. Each of the fixing members 46 includes a protruding block 462 depending from the top plate 42, and a locking ear 464 extending inward from an inner side of the protruding block 462 towards the other fixing portion 46. In the illustrated embodiment, the locking ear 464 is substantially cylindrical with a generally hemispherical distal end.

Each of the supporting elements 50 is L-shaped, and includes a fixing pole 52 and a supporting pole 54 received in the fixing pole 52. The fixing pole 52 includes an annular mounting portion 522, and an elongated receiving portion 524 extending upward and perpendicularly from the mounting portion 522. The mounting portion 522 defines an axial through hole 523 in a central portion thereof. The through hole 523 has a diameter substantially equal to a diameter of the pivot shaft 28. The receiving portion 524 defines a receiving hole 525 along an axial direction thereof. A bottom of the receiving hole 525 of the receiving portion 524 communicates with the through hole 523 of the mounting portion 522.

The supporting pole 54 of each supporting element 50 is elongated, and has a length approximately equal to that of the receiving hole 525. A connecting hole 540 is transversely defined in a top end of each supporting pole 54. The connecting hole 540 is generally cylindrical, and a size of the connecting hole 540 is substantially equal to a size of each of the locking ears 464 of the fixing members 46 of the supporting platform 40. Alternatively, the locking ears 464 can be formed on the supporting poles 54, and the connecting holes 540 can be defined in the protruding blocks 462 of the fixing members 46 of the supporting platform 40.

The supporting pole 54 of each supporting element 50 is telescopically moveable with respect to the fixing pole 52 between a first position in which the supporting pole 54 is wholly received in the receiving hole 525, and a second position in which the supporting pole 54 protrudes a maximum distance out from the receiving hole 525. When the supporting pole 54 is at the first position, a length of the supporting element 50 is approximately equal to a length of the fixing pole 52. In the first position (as illustrated in FIG. 1), the supporting element 50 is parallel to the central axis of the vibration generator 20. When the supporting pole 54 is at the second position (see FIG. 5), the length of the supporting element 50 is approximately equal to a sum of half of the length of the supporting pole 54 and a length of the corresponding fixing pole 52. In the second position, the corresponding locking ear 464 of the supporting platform 40 is engaged in the connecting hole 540 of the supporting pole 54.

When the vibration testing device 100 is assembled, the mounting portions 522 of the fixing poles 52 of the supporting elements 50 are mounted around the pivot shafts 28, respectively. Each of the pivot shafts 28 is horizontally connected between the corresponding side of the vibration generator 20 and the corresponding mounting base 10. The receiving portions 524 of the supporting elements 50 extend upward, and are perpendicular to the pivot shafts 28, respectively. The vibration generator 20 is spaced from a surface (not shown) which supports the mounting bases 10 thereon. The lubricating table 70 is located at a front side of the vibration generator 20, and is spaced from the vibration generator 20. The supporting platform 40 is positioned on the electromagnet 30, with the bottom plate 41 resting on a top surface of the electromagnet 30. The supporting poles 54 of the supporting elements 50 are fully received in the receiving portions 52, respectively. The top ends of the supporting poles 54 are spaced from the fixing members 46 of the supporting platform 40, but with the fixing members 46 generally aligned with the top ends of the supporting elements 50.

When an electric current is applied to the electromagnet 30, an attractive magnetic force is established by the electromagnet 30, such that the electromagnet 30 tightly holds the supporting platform 40. Thus the supporting platform 40 and the vibration generator 20 are connected to each other via the electromagnet 30. When the electric current applied to the electromagnet 30 is cut off, the attractive force disappears accordingly, such that the supporting platform 40 is easily moveable with respect to the electromagnet 30 from that moment on.

Referring also to FIG. 3, the control system 60 includes a lift control unit 62, a first rotary control unit 64 and a second rotary control unit 66. The lift control unit 60 is electrically connected to the supporting elements 50, and configured for controlling the telescopic movement of the supporting poles 54 of the supporting elements 50. The first rotary control unit 64 is electrically connected to the vibration generator 20, and configured to control the vibration generator 20 to rotate with respect to the mounting bases 10. The second rotary control unit 66 is electrically connected to the supporting elements 50, and configured to control the supporting elements 50 to rotate with respect to both the mounting base 10 and the supporting platform 40. The control system 60 can for example be mounted in one of the mounting bases 10.

When the vibration testing device is used, a product, such as an electronic device, needs to be tested. Firstly, the electronic device is fixed on the top plate 42 of the supporting platform 40. Then the vibration generator 20 is started to generate a vibration force along the vertical directions of the vibration testing device 100. The electronic device incurs vibration generated from the vibration generator 20, and thereby a vibration-resistance performance of the electronic device along the vertical directions is tested.

Figure 4:
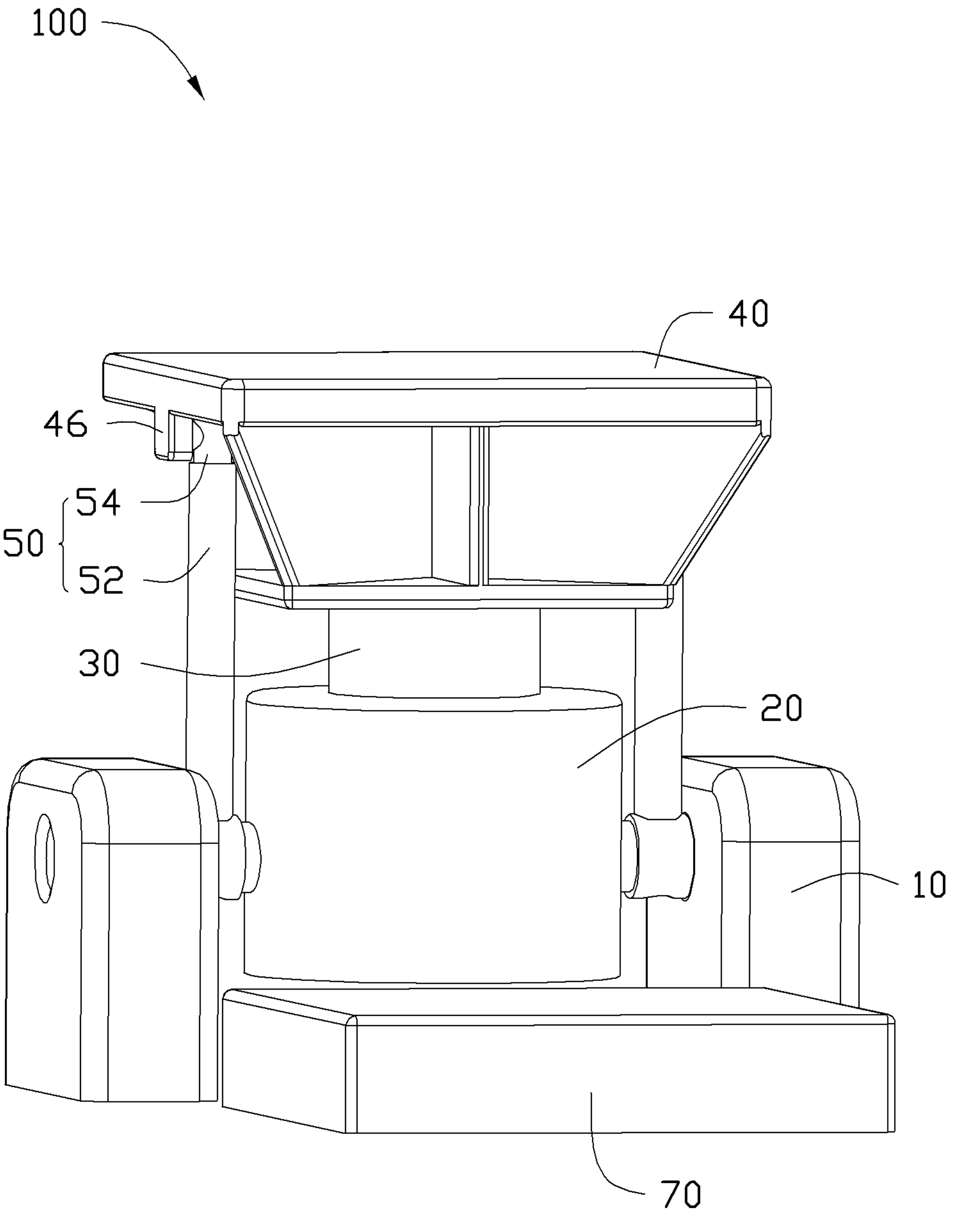
FIGS. 4-9 are schematic views showing successive different statuses of the vibration testing device as the vibration testing device is gradually changed from the first testing status of FIG. 1 to a second testing status in which horizontal vibration forces can be generated.
Figure 5:
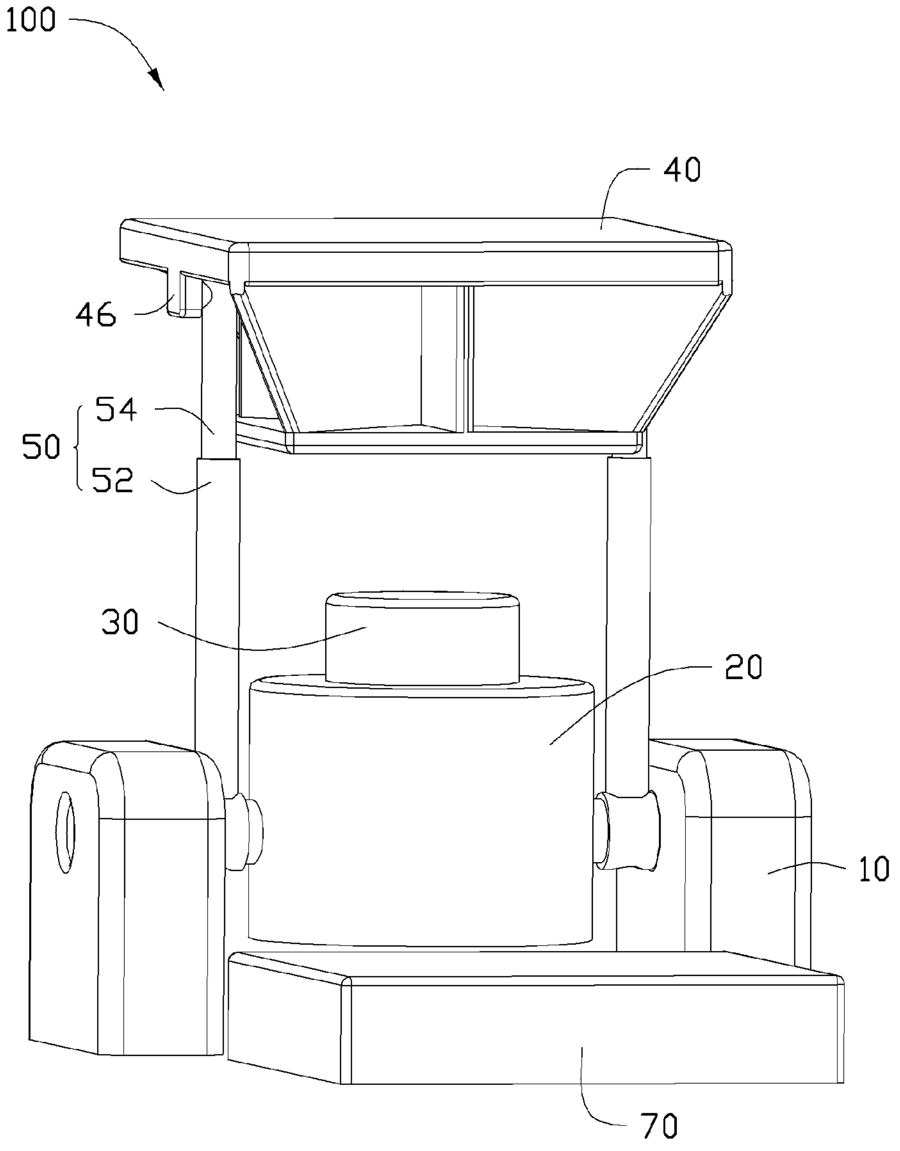

Referring to FIGS. 4 and 5 together, after testing the vibration-resistance performance of the electronic device along the vertical directions, the lift control unit 62 of the control system 60 controls the supporting poles 54 to move upward to protrude out of the fixing poles 52. Thus, the top ends of the supporting poles 54 gradually approach the fixing members 46 of the supporting platform 40. The locking ears 464 of the fixing members 46 become engaged in the connecting holes 540 of the supporting poles 54, respectively, thereby connecting the supporting elements 50 and the supporting platform 40 together (FIG. 4). In this embodiment, the locking ears 464 ride along the top ends of the supporting poles 54 and are snappingly engaged in the connecting holes 540. At this moment, the electric current applied to the electromagnet 30 is cut off, such that the attractive force between the electromagnet 30 and the supporting platform 40 is no longer present, and the supporting platform 40 is easily moveable with respect to the electromagnet 30. Thus, the supporting platform 40 with the electronic device attached thereon is separated from the electromagnet 30 as the supporting poles 54 continue to move further upward (FIG. 5).

Figure 6:
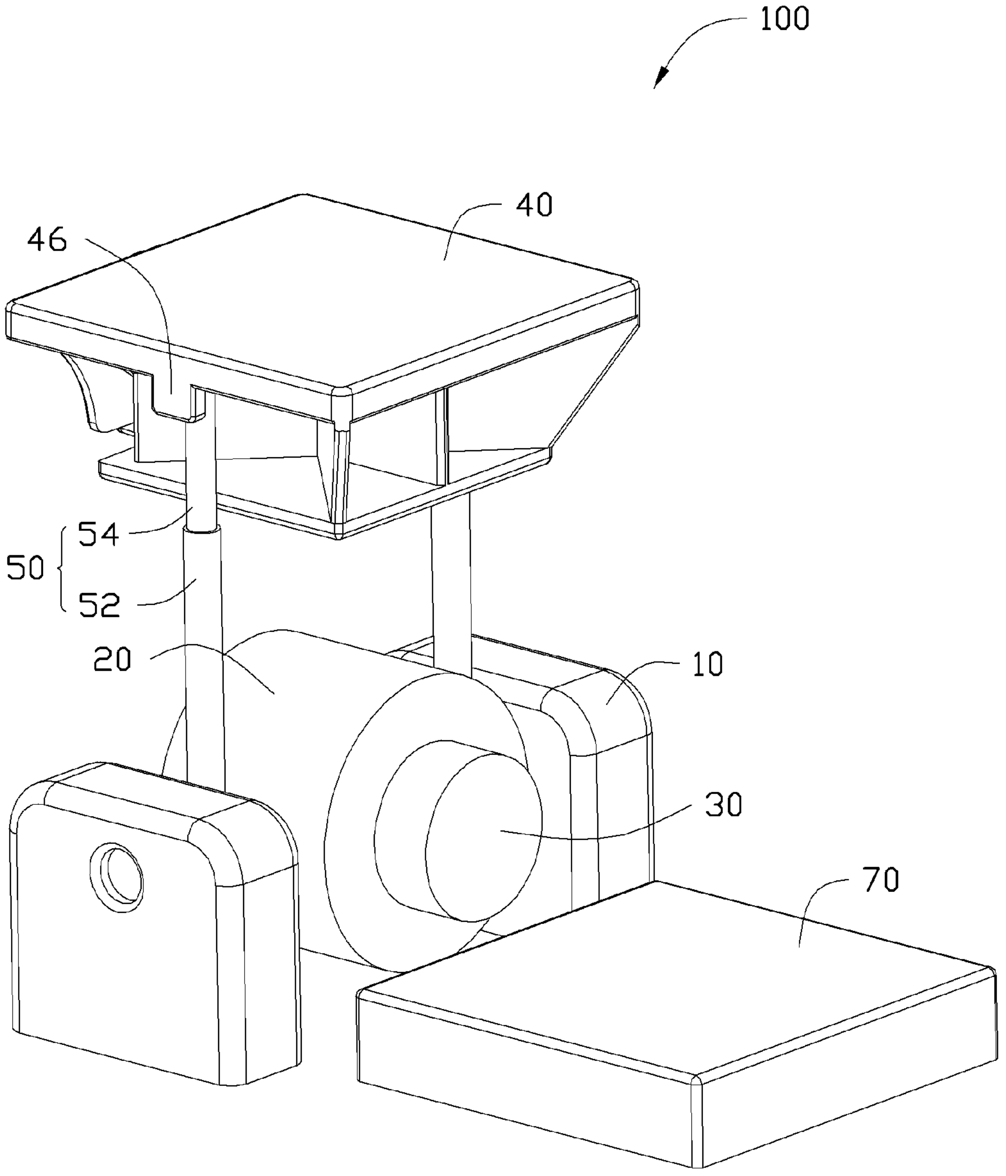
Figure 7:
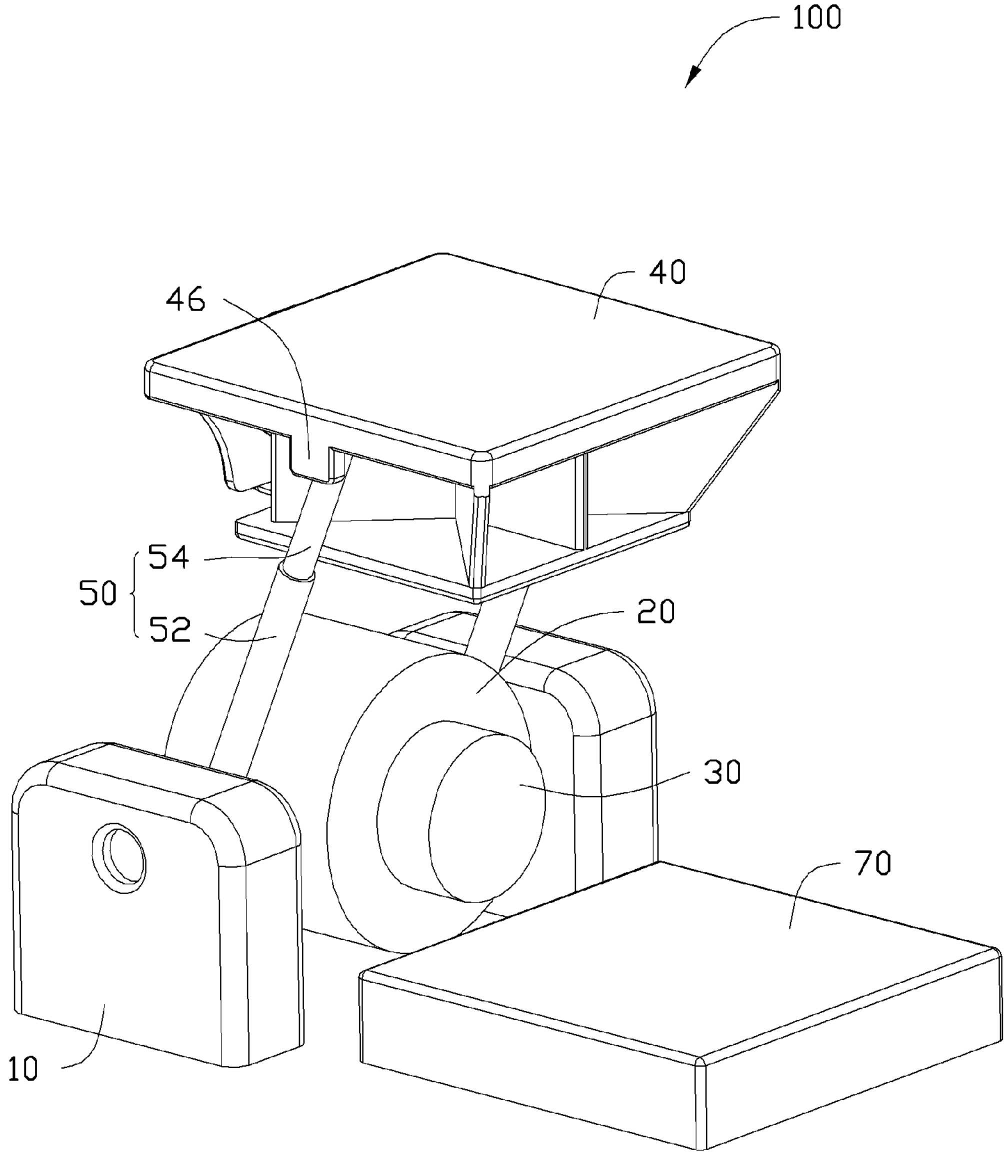

Referring to FIGS. 6 and 7 together, when the supporting poles 54 reach the second position, a distance between the supporting platform 40 and the electromagnet 30 is largest. At this moment, the first rotary control unit 64 controls the vibration generator 20 with the electromagnet 30 mounted thereon to rotate with respect to the pivot shafts 28. The vibration generator 20 and the electromagnet 30 both rotate about 90 degrees, such that the electromagnet 30 faces and is adjacent to the lubricating table 70 (FIG. 6). The electromagnet 30 is, however, spaced from the lubricating table 70. The central axis of the vibration generator 20 and the central axis of the electromagnet 30 are both parallel to a horizontal direction of the vibration testing device 100. Then the second rotary control unit 66 controls the supporting elements 50 to rotate with respect to the mounting bases 10, so that the supporting platform 40 gradually moves down and approaches the lubricating table 70 (FIG. 7).

Figure 8:
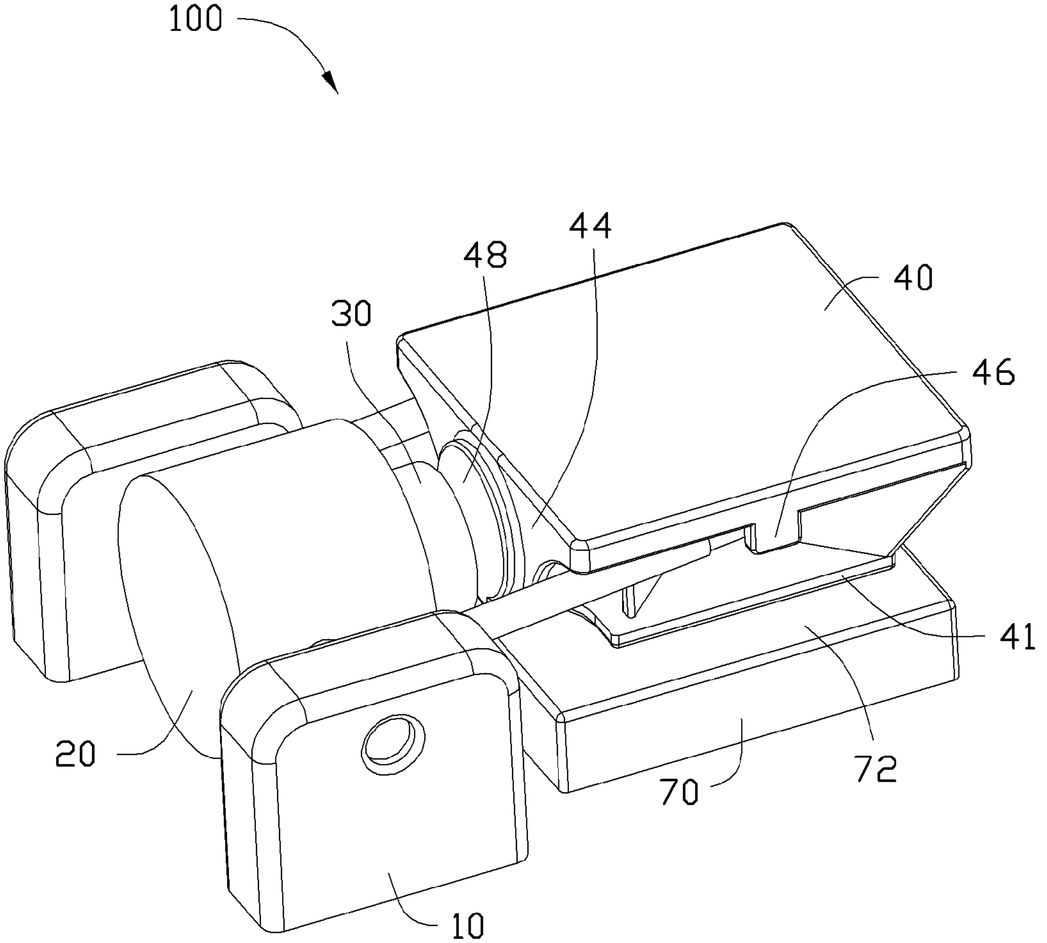
Figure 9:
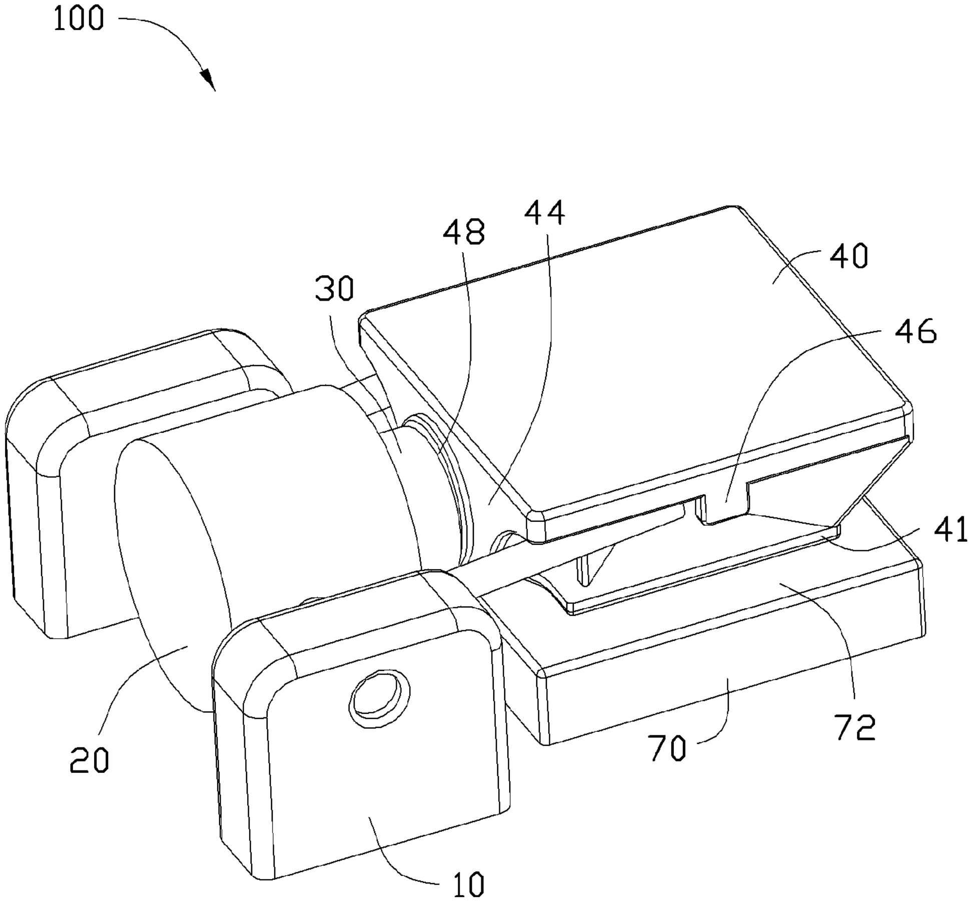

Referring to FIGS. 8 and 9 together, when the supporting elements 50 are rotated to be parallel to the central axis of the vibration generator 20 again, the bottom plate 41 of the supporting platform 40 contacts the top surface of the lubricating table 70, and the contacting member 48 of the supporting platform 40 faces the electromagnet 30 (FIG. 8). At this moment, however, the contacting member 49 of the supporting platform 40 is spaced from the electromagnet 30. Then, the lift control unit 62 controls the supporting poles 54 to move backward until the contacting member 49 of the supporting platform 40 contacts the electromagnet 30. Next, an electric current is applied to the electromagnet 30 again, to thereby cause the electromagnet 30 to generate attracting force between the electromagnet 30 and the supporting platform 40 to fixedly interconnect the vibration generator 20 and the supporting platform 40. Finally, the lift control unit 62 controls the supporting poles 54 to move further backward, so that the locking ears 464 of the fixing members 46 are disengaged from the connecting holes 540 of the supporting poles 54. After the disengagement, the supporting poles 54 continue to move backward until the supporting poles 54 are fully retracted back inside the fixing poles 52 (FIG. 9).

In this state, since the central axis of the vibration generator 20 is parallel to the horizontal direction, when the vibration generator 20 is activated, vibration forces along the horizontal directions of the vibration testing device 100 are generated. The electronic device incurs the vibration generated from the vibration generator 20, and thereby a vibration-resistance performance of the electronic device along the horizontal directions is tested. As the top surface of the lubricating table 70 has lubricating oil spread thereon, friction between the supporting platform 40 and the lubricating table 70 is greatly decreased during the vibration-resistance performance test.

Thus, due to the vibration testing device 100 being able to test the vibration-resistance performance of the electronic device along both the vertical directions and the horizontal directions, the test results can more accurately reflect the actual performance of the electronic device.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A vibration testing device, comprising:

two mounting bases;

a vibration generator located between the mounting bases;

two pivot shafts each connected between the vibration generator and one of the two mounting bases, respectively;

a supporting platform arranged above the vibration generator;

two supporting elements rotatably mounted around the pivot shafts, respectively, each supporting element being telescopically extendable and retractable; and a control system comprising a lift control unit for controlling telescopic movement of the supporting elements, a first rotary control unit for controlling a rotational movement of the vibration generator about the pivot shafts, and a second rotary control unit for controlling rotational movement of the supporting elements about the pivot shafts, the control system being configured for controlling the vibration testing device to move between a first testing status in which vertical vibration forces are generated by the vibration generator and applied to the supporting platform and a second testing status in which horizontal vibration forces are generated by the vibration generator and applied to the supporting platform.

2. The vibration testing device as described in claim 1, further comprising an electromagnet between the vibration generator and the supporting platform, wherein when an electric current is applied to the electromagnet, an attracting force is generated by the electromagnet such that the electromagnet holds the supporting platform.

3. The vibration testing device as described in claim 2, wherein the supporting platform comprises a contacting member at a rear thereof, and when the vibration testing device is at the second testing status, the contacting member abuts against the electromagnet.

4. The vibration testing device as described in claim 2, wherein the supporting platform comprises a bottom plate, a top plate and a plurality of connecting plates connected between the bottom plate and the top plate, the top plate configured for having an under test product mounted thereon.

5. The vibration testing device as described in claim 1, wherein each of the supporting elements comprises a fixing pole and a supporting pole received in the fixing pole, the supporting pole being telescopically moveable with respect to the fixing pole under control of the lift control unit.

6. The vibration testing device as described in claim 5, wherein each of the fixing poles comprises an elongated receiving portion, the receiving portion defining a receiving hole for receiving the corresponding supporting pole therein.

7. The vibration testing device as described in claim 6, wherein each of the fixing poles further comprises an annular mounting portion mounted around a corresponding one of the pivot shafts.

8. The vibration testing device as described in claim 1, wherein each of the pivot shafts comprises one end rotatably connected with a corresponding side of the vibration generator and another end fixedly connected with a corresponding one of the mounting bases.

9. The vibration testing device as described in claim 8, wherein the supporting platform comprises two fixing members aligned with top ends of the supporting elements, respectively.

10. The vibration testing device as described in claim 9, wherein each of the fixing members comprises one of a locking ear and a connecting hole, each of the supporting elements comprises the other one of a locking ear and a connecting hole, and each locking ear is detachably engagable in the corresponding connecting hole.

11. The vibration testing device as described in claim 1, further comprising a lubricating table located at a front side of the vibration generator and spaced from the vibration generator, the supporting platform contacting the lubricating table when the vibration testing device is at the second testing status.

12. A vibration testing device, comprising:

at least one mounting base;

a vibration generator connected to the at least one mounting base via at least one pivot shaft;

a supporting platform arranged above the vibration generator;

a lubrication platform located beside and spaced from the vibration generator;

at least one supporting element rotatably connected with the at least one pivot shaft, the at least one supporting element comprising a telescopic arm; and a control system comprising a lift control unit for controlling the at least one supporting element to extend or shorten, a first rotary control unit for controlling the vibration generator to rotate relative to the at least one mounting base, and a second rotary control unit for controlling the at least one supporting element to rotate relative to the at least one pivot shaft to move the supporting platform onto the lubrication platform.

13. The vibration testing device as described in claim 12, further comprising an electromagnet between the vibration generator and the supporting platform, wherein when an electric current is applied to the electromagnet, an attracting force is generated by the electromagnet such that the electromagnet holds the supporting platform.

14. The vibration testing device as described in claim 13, wherein the supporting platform comprises a contacting member at a rear side thereof, and when the supporting platform is moved onto the lubrication platform, the contacting member faces the electromagnet.

15. The vibration testing device as described in claim 13, wherein the supporting platform comprises a bottom plate, a top plate and a plurality of connecting plates connected between the bottom plate and the top plate, the top plate configured for having an under test product mounted thereon.

16. The vibration testing device as described in claim 12, wherein the at least one supporting element comprises a fixing pole and the telescopic arm received in the fixing pole, and the telescopic arm is telescopically moveable relative to the fixing pole under control of the lift control unit.

17. The vibration testing device as described in claim 16, wherein the fixing pole comprises an elongated receiving portion, the receiving portion defining a receiving hole for receiving the telescopic arm therein.

18. The vibration testing device as described in claim 17, wherein the fixing pole further comprises an annular mounting portion mounted around a corresponding pivot shaft, the receiving portion being perpendicular to the mounting portion.

19. The vibration testing device as described in claim 12, wherein the at least one pivot shaft comprises one end rotatably connected with the vibration generator and another end fixedly connected with the at least one mounting base.

20. The vibration testing device as described in claim 19, wherein the supporting platform comprises at least one fixing member aligned with a top end of the at least one supporting element, the at least one fixing member comprises one of a locking ear and a connecting hole, the at least one supporting element comprises the other one of a locking ear and a connecting hole, and the locking ear is detachably engagable in the connecting hole.

* * * * *